United States Patent [19]

Theuninck et al.

[11] Patent Number: 4,957,769

[45] Date of Patent: Sep. 18, 1990

[54] ANIMAL FEED COMPOSITION AND METHOD OF MAKING SAME

[75] Inventors: Duane H. Theuninck, Elk River, Minn.; Daniel Downs, Detroit Lakes, both of Minn.

[73] Assignee: Cargill, Incorporated, Minneapolis, Minn.

[21] Appl. No.: 338,288

[22] Filed: Apr. 14, 1989

Related U.S. Application Data

[60] Division of Ser. No. 273,117, Nov. 16, 1988, Pat. No. 4,851,244, which is a continuation of Ser. No. 13,910, Feb. 12, 1987, abandoned, which is a continuation of Ser. No. 771,274, Aug. 30, 1985, abandoned.

[51] Int. Cl.$^5$ ............................................. A23D 1/00
[52] U.S. Cl. ........................................ 426/74; 426/69; 426/623; 426/630; 426/658; 426/807
[58] Field of Search ................... 426/74, 69, 623, 658, 426/630, 635, 807

[56] References Cited

U.S. PATENT DOCUMENTS 4,027,043 5/1977 Schroeder et al. .................... 426/74
4,431,675 2/1984 Schroeder et al. .................... 426/69

Primary Examiner—R. B. Penland
Attorney, Agent, or Firm—Fitch, Even, Tabin, & Flannery

[57] ABSTRACT

An animal feed block and its manufacture are described wherein the block includes and is made through the chemical reaction of an aqueous blend of an edible trivalent metal salt, magnesium oxide, phosphorous and nutritive ingredients which upon curing provides a rigid feed block with internal control over the rate at which animals consume it.

13 Claims, No Drawings

ANIMAL FEED COMPOSITION AND METHOD OF MAKING SAME

This is a division, of application Ser. No. 273,117, filed Nov. 16, 1988 which was a Continuation application of 13,910 filed Feb. 12, 1987 now U.S. Pat. No. 4,851,244, now abandoned, which was a Continuation application Ser. No. 771,274 filed Aug. 30, 1985 now abandoned.

This invention relates to animal feed supplements in rigid form which are fed ad-libitum. More specifically, it relates to a hardened feed block, manufacture thereof and improved control over the rate of ad-libitum consumption of the block by the animal.

A common goal in the practice of animal husbandry is to supply supplemental nutrients and/or medicaments to animals. Incorporation of nutrients and/or medicaments into the feed block allows for free-choice feeding and a reduction in labor requirements for provision of the feed supplement to the animal. When providing a feed supplement to the animal on a free-choice basis, it is desirable to maintain control over feed supplement consumption rates in order to optimize animal intake of supplemental nutrients and/or medicaments.

Several methods have been utilized in the preparation of animal feed blocks containing molasses or other nutritive liquids as the primary ingredients. U.S. Pat. No. 3,961,081 to McKenzie describes a feed block prepared through the evaporative heating of molasses under vacuum.

Reactions of metal oxides such as calcium and magnesium oxide with water-bearing media such as molasses and a variety of other agents also are known.

U.S. Pat. No. 4,062,988 to Desantis describes the use of calcium oxide in the presence of a fatty acid to form a hard soap within the block.

U.S. Pat. No. 4,234,608 to Linehan discloses a block in which magnesium oxide and dicalcium phosphate are reacted in a water-bearing medium under controlled temperature conditions.

U.S. Pat. No. 4,265,916 to Skoch et al. describes subjecting molasses, water, clay and a phosphorus source to high-shear mixing prior to addition of magnesium oxide and ferrous sulfate to form a feed block.

U.S. Pat. No. 4,431,675 to Schroeder et al. describes a combination of calcium and magnesium oxide along with a phosphorus source to achieve hardness in a feed block.

It is an object of the present invention to provide a nutritional and/or medicated animal feed supplement in a hardened form which permits and controls free-choice feeding.

Another object of the invention is to provide a method of producing a rigid animal feed block which includes the aqueous combination of nutritive ingredients, an edible trivalent metal salt, an edible, water soluble phosphorus source and magnesium oxide to obtain a reaction mixture that will form a rigid block.

Still another object of the invention is to provide a method of controlling the hardness of the feed block through manipulation of levels of the trivalent metal salt, magnesium oxide, phosphorus and solids in the block.

It has been discovered that a rigid animal feed composition may be obtained with an edible trivalent metal ion. The composition includes a blend of from about 30.0 to about 80.0 percent by weight of an aqueous nutritive liquid, from about 0.5 to about 15.0 percent by weight of any edible and water soluble source of phosphorous, from about 1.0 to about 10.0 percent by weight of a magnesium oxide, from about 5.0 to about 40.0 percent by weight of dry nutritive ingredients, and from about 1.0 to about 7.0 percent by weight of a trivalent edible metal salt to provide a rigid feed composition. All percentages herein are by weight. As used herein edible means an animal will not be harmed by eating the material at the levels contemplated herein.

The process for making the composition of the invention comprises mixing the water soluble and edible source of phosphorous with the aqueous nutritive liquid which is at a temperature in the range of about 40° F. to about 140° F. to provide a phosphate-nutritive aqueous feed mix; mixing trivalent metal, salt with the phosphate-nutritive aqueous feed mix to provide a gel through the reaction of trivalent metal salt with the phosphorous source; mixing the magnesium oxide with the gel to provide a gel feed; mixing dry nutritive ingredients with the gel feed to provide a flowable blend or material; and allowing the flowable blend or material to cure providing a rigid animal feed block.

Preferably the edible trivalent metal ion used in the invention is $Fe^{3+}$, $Al^{3+}$ or $Cr^{3+}$ the sources of which can be any edible dissociable salt having a trivalent metal cation such as $Fe_2(SO_4)_3$, $Fe(NO_3)_3$, $FeCl_3$, $Al_2(SO_4)_3$, $Al(NO_3)_3$, $AlCl_3$, $CrCl_3$ or $Cr_2(SO_4)_3$, the most preferable salt being $FeCl_3$. The trivalent metal salt should not have an anion which will tie up the phosphorous source and not permit the trivalent salt to dissociate; hence, trivalent cation salts such as phosphates should not be used as a source of trivalent cation.

Generally, in accordance with the present invention a rigid feed composition is provided for domestic animals by a blend of ingredients as set forth in Table 1.

TABLE 1

| Formulation of The Rigid Feed Composition | | |
|---|---|---|
| | Formula %, by weight | |
| Ingredient | Broad | Preferred |
| Nutritive, liquid | 30.0–80.0 | 45.0–70.0 |
| Phosphorus source | 0.15–15.0 | 2.0–10.0 |
| Magnesium oxide | 1.0–10.0 | 3.0–7.0 |
| Trivalent metal salt | 1.0–7.0 | 1.5–4.5 |
| Nutritive, dry | 5.0–40.0 | 10.0–30.0 |

For purposes of the present invention, the term "domestic animals" includes ateriodactyl animals such as swine, sheep and cattle, solid hoofed animals such as horses and domestic pets such as dogs and cats. The term includes both monogastric and ruminant animals. The term rigid means a feed composition having a hardness in the range of from about 10 mm to about 100 mm as measured by a penetrating bolt as hereinafter described.

Nutritive Liquid Ingredients

Molasses is the preferred nutritive liquid in the formation of the rigid feed composition because of its high solids and energy levels. Any molasses may be used, but a brix range of 79.5 or higher is preferred. Other nutritive liquids commonly used in liquid feeds which may be used in the invention include, but are not limited to, hemicellulose extract, whey and related products, lignin liquors, corn steep liquor, condensed molasses solubles, fat, and high fructose corn syrup. They are not as preferred as molasses because they have lower energy levels, higher moisture levels, or are less predictable with respect to reactivity rate in the formation of a rigid composition.

Phosphorus Sources

Any water soluble, edible phosphorus source such as phosphoric acid, ammonium polyphosphates, orthophosphates and mono-ammonium, mono-sodium, mono-potassium phosphates may be used. Polyphosphates such as ammonium polyphosphate are a slight improvement over orthophosphates since the colloid which forms with the trivalent metal cation is larger and more complex. Polyphosphates develop hardness at a faster rate in the formation of a rigid feed block because they form a more complex colloid with reaction with the trivalent cations than the colloid formed from orthophosphates. Dry sources of phosphorus such as dicalcium phosphate and magnesium phosphate react slowly with the trivalent metal cation and therefore are not preferred phosphorous sources in connection with the invention.

Magnesium Oxide

The magnesium oxide reacts with the water in the blend to form a magnesium hydroxide. This reaction ties up free water in the composition. This reaction is time and temperature dependent. As time and temperature increase, the proportion of magnesium oxide to magnesium hydroxide decreases until the flowable blend becomes a rigid block.

A suitable grade of magnesium oxide has a sufficient chemical reactivity to hydrate under conditions of the reaction mixture. The hydration of the magnesium oxide in the method is critical to the hardening of the block due to the reduction of the free water caused by the reaction. Chemical reactivity of magnesium oxides differ due to the method of production, particle size, and degree of hydration which may occur during storage after production. Two methods of producing magnesium oxide of suitable reactivity are the calcination of magnesite ($MgCO_3$) or magnesium hydroxide. The term "reactivity" is used in the art as a reference to the performance of magnesium oxide in cements and refractory products. A common reactivity test involved reacting an excess of magnesium oxide with acetic acid, and as a consequence, the basic suspension will cause phenolphthalein indicator to turn pink. The procedure involves the following steps:

1. Weigh accurately 0.5 grams of magnesium oxide for each trial analysis.
2. Add 40 to 50 milliliters of distilled water.
3. Add 2 to 3 drops of phenolphthalein indicator.
4. Set the mixture on a magnetic stir plate and quickly add 10 milliliters of 1 N acetic acid. This should be done with a simultaneous start of a stop watch.
5. Measure the time for return of the pink color. The reactivity test, used with other indicators accurately determines the type of magnesium oxide that is suitable for the most sufficient setting or blocking of the molasses based animal feed formulation. The magnesium oxide products preferably suitable for use in the present invention have reaction times of about 8 seconds to about 3 minutes.

Particle size of the magnesium oxide affects the quickness in which the magnesium oxide becomes hydrated. The smaller the magnesium oxide particles, the faster the formula will become a hard block. At least 85% of magnesium oxide should pass through a 300 mesh screen for adequate dispersion and reactivity time of the particles.

Trivalent Metal Salt

Dissociated edible trivalent metal cations such as iron, aluminum, chromium and lanthanum improve the formation of the rigid composition, and hence, formation of a feed block by taking part in formation of a colloid matrix structure. The metal cation also reacts with the metal oxide; this generates heat and drives the hydration of the magnesium oxide.

It is important to the invention that the trivalent metal cations form a colloid matrix structure with the phosphates in the composition of the invention. Within this matrix, free water is trapped thus enhancing the hardening of the composition.

The trivalent metal cations may come in a solid salt or dissociated in a solution. If the metal comes as a solid salt, ionization must occur during mixing of the formula. Salts of the metals may be chloride, subsulfate and nitrate. They may not have ions which correspond to the phosphorous source such as a phosphate, as these tie up the phosphorous source and interfere with the dissociation of the trivalent metal salt and with formation of the colloid matrix.

Trivalent metal cations are a marked improvement over divalent cations as the matrix developed by the trivalent cation is more three-dimensional and complex than the colloid formed using divalent cations and hence forms an improved block.

Ferric chloride is the preferred source for the trivalent metal cations. Solutions are available from 30 to 48 percent solids. Ferric chloride reacts with the phosphates to form an insoluble floc. These ferric phosphate colloids are highly insoluble and very durable which is important to forming a rigid feed composition. The effective coagulation is not highly pH dependent and will occur over pH range of 4 to 11.

The use of the chloride salt of the trivalent cation is preferred because the chloride ion will control the feed intake of domestic animals at a level in the feed composition of from about 1 to about 12 percent by weight in excess of the total level of monovalent cations other than ammonium and hydrogen. In this connection Reexamination Certificate B 14,182,755 issued Mar. 29, 1983 to McNeff is fully incorporated by reference herein.

An important function of animal feed blocks is to allow for free-choice feeding of blocks to animals. While free-choice feeding results in significant labor savings, careful animal husbandry still requires a degree of control over ad-libitum supplement consumption rates. Previous block technology has relied solely upon block hardness to limit consumption. Use of the chloride salt of the trivalent salt in the invention provides both the cation for the hardening process and the chloride anion for intake control. As a result, there is an improvement in the degree to which intake can be controlled. Hence in the present invention, intake is a function of both block hardness and ferric chloride level. Either factor or both could be altered to effect a desired change in block consumption rate. Conversely, should it become desirable to change one factor, the other could also be adjusted to result in no net change in block consumption rate.

Nutritive Dry Ingredients

Nutritive dry ingredients have less than 20 percent by weight moisture and include, but are not limited to wheat middlings, soybean meal, urea, limestone, corn, sodium chloride, potassium chloride, meat and bone meal and others as are known in the art. They are included in the composition of the invention according to their ability to provide a desired nutritional value. For example, soybean meal, urea, and meat and bone meal might be included as sources of protein, limestone as a source of calcium and corn as a source of energy. Sodium chloride and/or potassium chloride may be added to effect a desired nutritional balance to the feed. Choice of dry feed ingredients as components of a block is primarily governed by the nutrient content of that ingredient relative to the desired nutrient content of the finished block.

The amounts of some, but not all, dry ingredients used in the invention are limited by the tendency of the ingredient to impart an increased viscosity to the reaction mixture. Ingredients vary in their effect on viscosity. For example, approximately 25% soybean meal will result in the same viscosity as 10% wheat middlings. Alternatively, sodium chloride has little, if any, effect on viscosity of the reaction mixture. It is advantageous to select ingredients such that viscosity of the reaction moisture does not exceed 50,000 cps in order to facilitate adequate mixing. Preferably after completion of blending of the ingredients, but before curing, the blend of ingredients will have a viscosity in the range of from about 5,000 to about 25,000 cps at the resulting temperature of the flowable blend at that time.

Chemical Interactions

While not intending to be bound by any theory, the following are believed to be important chemical reactions to the invention.

(1) Phosphate and Trivalent Cation—The cations react with phosphates in the blend. This reaction results in a highly insoluble phosphate colloid, e.g., a ferric phosphate colloid. These colloid gels are highly three-dimensional. Water is trapped within the colloid structure causing the composition of the invention to thicken and harden.

(2) Magnesium Oxide and Water—As previously described the magnesium oxide reacts with the water in the ingredients of the invention to hydrolyze the magnesium oxide to a hydroxide to yield heat and tie up water in the composition.

(3) The Trivalent Cation Salt and Magnesium Oxide—If excess trivalent cation salt exists in the blend following phosphate colloid formation, an acid-base reaction occurs between the trivalent cation salt and magnesium oxide. This reaction generates heat and will eliminate magnesium oxide from the hydration step. Adequate amounts of magnesium salt must remain for hydration or a softer block be produced.

(4) Magnesium Oxide and Phosphates—If excess phosphates exist in the blend following phosphate colloid formation, an acid-base reaction occurs between the phosphate and magnesium oxide. This reaction has much less impact than excess trivalent cation salt has on final block hardness and thus it is preferred to have excess phosphate rather than excess trivalent cation salt if increased hardness is desired.

Many other interactions occur of which less is understood. Sugars interact with the metal cation. Salts partially destroy the magnesium hydroxide formation. Calcium carbonate interferes with the formation of the ferric phosphate colloid gel. Other reactions of minor importance may also be occurring. It is to be understood that the reactions listed may not be the only reason for block formation.

PREPARATION METHOD

In preparation, a ribbon type horizontal mixer is utilized. High shear mixing may also be used, but is not necessary.

The order of incorporation is important so as to develop the required block hardness. Ingredients are admixed into the nutritive liquids. Incorporation order which is preferably into the nutritive liquids is: (1) liquid phosphorus source, (2) trivalent metal salt solution, (3) magnesium oxide, (4) dry feeds and medicants. It is not preferred, but urea and sodium or potassium chloride may be added to the molasses with the liquid phosphorous source.

The nutritive liquids should be between 40° F. and 140° F., preferably between 70° F. and 90° F. If fat is to be added it must be in a flowable liquid state (120° F.–140° F.).

The composition after the completion of mixing is a thick, flowable liquid which can be pumped into boxes or reusable molds. These boxes or molds are stored for a period of time in order to cure the product to a degree of hardness required for shipping and handling. Typically curing time will range from 24 to 48 hours.

EXAMPLE 1

One kilogram blocks were prepared using a laboratory mixer. Ingredients were admixed in at 75° F. with a Fisher Stedi-Speed mixer at 1500 rpm in the order shown below. All formulas contained equal amounts of dry matter and iron.

| Ingredient | Formula, % by weight | | |
|---|---|---|---|
| | A | B | C |
| Molasses | 54.80 | 54.80 | 54.80 |
| Urea | 2.30 | 2.30 | 2.30 |
| Salt (NaCl) | 2.50 | 2.50 | 2.50 |
| Ammonium polyphoshate | 5.60 | 5.60 | 5.60 |
| Water | — | — | 4.78 |
| 30% ferric chloride brine | 9.80 | — | — |
| 31.3% ferrous chloride brine | — | 9.80 | — |
| Ferrous sulfate | — | — | 5.02 |
| Magnesium oxide | 5.00 | 5.00 | 5.00 |
| Calcium carbonate | 1.20 | 1.20 | 1.20 |
| Wheat middlings | 1.80 | 1.80 | 1.80 |
| Soybean meal | 17.00 | 17.00 | 17.00 |
| Total | 100.00 | 100.00 | 100.00 |
| Hardness of the block, mm | 27 | >102 | >111 |

The ingredients were mixed as follows:
1. Urea, salt and ammonium polyphosphate were added to molasses and water and mixed for 3 minutes;
2. Iron salts were added and mixed for 5 minutes;
3. Magnesium oxide was added and mixed for 5 minutes; and
4. Calcium carbonate, middlings and soybean meal were added and mixed for 5 minutes. The blocks were cured for 3 days and their hardness measured.

Hardness of the block was measured with an instrument designed in the laboratories of Cargill, Inc. A four pound sliding weight is dropped 2 ft. $3^{3}/8$ inches onto a bolt resting on the surface of the block. The cross-sectional area of the bolt is $7.96 \times 10^{-2}$ square inches. The initial pressure on the bolt is 114.6 ft.-pounds per square inch. Hardness is reported as millimeters of bolt penetration into the block. Values are inversely related to block hardness. Values with a "greater than" sign indicate that the bolt penetrated to the bottom of the block container. It can be seen from these data that the trivalent ferric ion was effective in promoting hardness formation while the divalent ferrous ion was not.

EXAMPLE 2

Various trivalent transition metal cations may be substituted for the ferric ion in the block formation process. Aluminum chloride and chromic chloride were substituted for ferric chloride at equal molar levels of cations. Blocks were made and hardness tested as in example 1. All three formulas resulted in blocks of similar hardness.

| Ingredient | Formula, % by weight | | |
|---|---|---|---|
| | A | B | C |
| Molasses | 54.80 | 54.80 | 55.20 |
| Urea | 2.30 | 2.30 | 2.30 |
| Salt (NaCl) | 2.50 | 2.50 | 2.50 |
| Ammonium polyphosphate | 5.60 | 5.60 | 5.60 |
| 30% ferric chloride brine | 9.80 | — | — |
| 46% aluminum chloride brine | — | 9.80 | — |
| 53% chromic chloride brine | — | — | 9.40 |
| Magnesium oxide | 5.00 | 5.00 | 5.00 |
| Calcium carbonate | 1.20 | 1.20 | 1.20 |
| Wheat middlings | 1.80 | 1.80 | 1.80 |
| Soybean meal | 17.00 | 17.00 | 17.00 |
| Total | 100.00 | 100.00 | 100.00 |
| Hardness, mm | 48 | 30 | 45 |

EXAMPLE 3

Various nutritive liquid ingredients are utilized in the invention in this example. Blocks were prepared as in the previous examples. All formulas resulted in acceptable blocks.

| Ingredient | Formula, % by weight | | | | |
|---|---|---|---|---|---|
| | A | B | C | D | E |
| Molasses | 29.42 | 36.99 | 30.34 | 32.31 | — |
| Whey | 25.00 | — | — | — | 60.00 |
| Fat | — | 15.00 | — | — | — |
| Water | — | 4.00 | — | — | — |
| Hemicellulose extract | — | — | 25.00 | — | — |
| Calcium Lignin sulfonate | — | — | — | 25.00 | — |
| Urea | 2.35 | 2.18 | 2.19 | 2.17 | — |
| Salt (NaCl) | 1.30 | 1.77 | 1.89 | 1.86 | — |
| Ammonium polyphosphate | 4.55 | 5.24 | 5.22 | 5.17 | 10.00 |
| 40% ferric chloride brine | 7.50 | 7.50 | 7.50 | 7.50 | 10.00 |
| Magnesium oxide | 5.00 | 5.00 | 5.00 | 5.00 | 10.00 |
| Calcium carbonate | 2.82 | 2.87 | 2.68 | 5.00 | — |
| Wheat middlings | 5.00 | — | — | — | — |
| Soybean meal | 17.06 | 19.45 | 19.58 | 19.67 | 10.00 |
| Total | 100.00 | 100.00 | 100.00 | 100.00 | 100.00 |

EXAMPLE 4

This example illustrates the role of both block hardness and the chloride ion in the control of block intake by cattle. Blocks were manufactured in a mixing tank equipped with two propeller-type mixers. Two hundred and fifty pound batches of each of four formulations were mixed and each batch was divided into two blocks for feeding. The mixing order and time of mixing of the ingredients was as described in example 1. Blocks were fed free-choice to four pens of crossbred heifers, (a formula per pen). Each pen contained five heifers. Block formulas and results in terms of block hardness and block consumption are shown below.

| Ingredient | Formula, % by weight | | | |
|---|---|---|---|---|
| | A | B | C | D |
| Molasses | 59.180 | 57.212 | 55.243 | 53.275 |
| Ammonium polyphosphate | 5.574 | 5.582 | 5.590 | 5.598 |
| 41% ferric chloride | 5.490 | 7.320 | 9.150 | 10.980 |
| Urea | 2.266 | 2.265 | 2.263 | 2.261 |
| Salt (NaCl) | 2.500 | 2.500 | 2.500 | 2.500 |
| Magnesium oxide | 5.000 | 5.000 | 5.000 | 5.000 |
| Soybean meal | 17.009 | 17.159 | 17.309 | 17.459 |
| Wheat middlings | 1.856 | 1.793 | 1.730 | 1.667 |
| Calcium carbonate | 1.124 | 1.169 | 1.214 | 1.259 |
| Total | 100 | 100 | 100 | 100 |
| Hardness rating, (1 = hardest) | 3 | 1 | 2 | 4 |
| Avg. intake, lb/head/day | 2.86 | 2.52 | 2.58 | 2.57 |

Block consumption rate was higher for block A than for the other three blocks. Blocks B and C were very similar in hardness and blocks A and D were noticeably softer. If hardness were controlling intake, consumption of block D should have been at least equal to block A. If chloride ion were controlling intake, intake should have progressed downward in a linear fashion as ferric chloride level increased. Rather, intake decreased in going from block A to B as both hardness and ferric chloride increased. Then, in moving to higher ferric chloride levels in blocks C and D, intake remained similar to block D, in spite of the fact that the blocks were softer. Both hardness and the chloride ion play a role in controlling animal consumption of blocks.

EXAMPLE 5

A 1000 pound batch of the formula shown below was used to make blocks in a pilot scale manufacturing facility. A horizontal ribbon-paddle mixer was used for mixing. Molasses was weighed into the mixer. Salt was admixed and mixed for 2 minutes after addition was complete. Ammonium polyphos was admixed and then mixed for 8 minutes after addition was complete. Ferric chloride was admixed and mixed for 5 minutes after addition was complete. Magnesium oxide was admixed and mixed for 4 minutes after mixing was complete. Remaining dry ingredients were then admixed. The mixture was then emptied into two hexagonal boxes that were 42 inches tall and 19 inches in diameter. The reaction mixture formed hardened blocks in the boxes in approximately 12 hours.

| Ingredient | % by weight |
|---|---|
| Molasses | 56.934 |
| Ammonium polyphosphate | 5.562 |
| 40% ferric chloride brine | 7.500 |
| Wheat middlings | 0.296 |
| Soybean meal | 20.788 |
| Magnesium oxide | 5.000 |
| Calcium carbonate | 1.168 |
| Salt (NaCl) | 2.500 |
| Trace mineral premix | 0.200 |
| Vitamin premix | 0.080 |
| Total | 100 |

It should be understood that while certain preferred embodiments of the present invention have been illustrated and described, various modifications thereof will become apparent to those skilled in the art. Accordingly, the scope of the present invention should be defined by the appended claims and equivalents thereof.

Various features of the invention are set forth in the following claims.

What is claimed is:

1. A rigid animal feed block consisting essentially of:
a rigidified blend of from about 30 to 80 percent by weight based upon the weight of the blend of an aqueous nutritive liquid;
from about 5 to about 40 percent by weight based upon the weight of the blend of a dry nutritive;
a colloid gel formed in an aqueous media from about 0.5 to about 15 percent by weight based upon the weight of the blend of a water soluble edible source of phosphorous and from about 1 to about 7 percent by weight based upon the weight of the blend of an edible trivalent metal salt having an ion selected from the group consisting of $Fe^{3+}$, $Al^{3+}$ or $Cr^{3+}$; and
from about 1 to about 10 percent by weight based upon the weight of the blend of magnesium oxide mixed with the colloid gel in an amount sufficient to provide magnesium hydroxide and tie up water to rigidify the blend and provide and rigid feed block having a hardness of about 10 mm to about 100 mm.

2. A rigid feed block as recited in claim 1 wherein:
said aqueous nutritive liquid comprises from about 45 to about 70 percent by weight of said blend;
said source of phosphorous comprises from about 2 to about 10 percent by weight of said blend;
said magnesium oxide comprises from about 3 to about 7 percent by weight of said blend;
said dry nutritive comprises from about 10 to about 30 percent by weight of said blend; and
said trivalent salt comprises from about 1.5 to about 4.5 percent by weight of said blend.

3. A rigid feed block as recited in claim 1 wherein said aqueous nutritive is molasses.

4. A rigid feed block as recited in claim 3 wherein said trivalent metal salt is $FeCl_3$.

5. A rigid animal feed block as recited in claim 3 wherein the aqueous media is the aqueous nutritive liquid.

6. A rigid feed block as recited in claim 1 wherein said phosphorous source is selected from the group consisting of phosphoric acid, mono ammonium phosphate, mono sodium phosphate, mono potassium phosphate, polyphosphates, orthophosphates or mixtures thereof.

7. A rigid feed block as recited in claim 6 wherein said trivalent metal salt is $FeCl_3$.

8. A rigid animal feed block as recited in claim 1 wherein the colloid gel is formed from the addition of the trivalent metal salt into the blend of the aqueous nutritive liquid and source of phosphorous.

9. A rigid feed block as recited in claim 8 wherein:
said aqueous nutritive liquid comprises from about 45 to about 70 percent by weight of said block;
said source of phosphorous comprises from about 2 to about 10 percent by weight of said block;
said magnesium oxide comprises from about 3 to about 7 percent by weight of said block;
said dry nutritive comprises from about 10 to about 30 percent by weight of said block; and
said trivalent salt comprises from about 1.5 to about 4.5 percent by weight of said block.

10. A rigid feed block as recited in claim 9 wherein said aqueous nutritive is molasses.

11. A rigid feed block as recited in claim 10 wherein said phosphorous source is selected from the group consisting of phosphoric acid, mono ammonium phosphate, mono sodium phosphate, mono potassium phosphate, polyphosphates, orthophosphates or mixtures thereof.

12. A rigid feed block as recited in claim 11 wherein said trivalent metal salt is $FeCl_3$.

13. A rigid feed block as recited in claim 10 wherein said trivalent metal salt is $FeCl_3$.

* * * * *

UNITED STATES PATENT AND TRADEMARK OFFICE
CERTIFICATE OF CORRECTION

PATENT NO. : 4,957,769
DATED : September 18, 1990
INVENTOR(S) : Duane H. Theuninck; Daniel Downs It is certified that error appears in the above-identified patent and that said Letters Patent is hereby corrected as shown below:

Column 1, line 6, after "1988" insert --now U. S. Pat.

No. 4,851,244,--.

lines 7-8, after "1987" delete "now U. S. Pat.

No. 4,851,244".

Column 6, line 44, in the table in EXAMPLE 1, change

"polyphoshate" to --polyphosphate--.

Column 8, line 61, change "0.296" to --0.269--.

Signed and Sealed this

Fourteenth Day of January, 1992

Attest:

HARRY F. MANBECK, JR.

*Attesting Officer*       *Commissioner of Patents and Trademarks*